United States Patent
Osawa

(10) Patent No.: US 8,399,050 B2
(45) Date of Patent: Mar. 19, 2013

(54) METHOD OF MANUFACTURING A MAGNETIC RECORDING MEDIUM

(75) Inventor: Yoshihito Osawa, Nagano (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 645 days.

(21) Appl. No.: 12/461,516

(22) Filed: Aug. 13, 2009

(65) Prior Publication Data
US 2010/0040772 A1 Feb. 18, 2010

(30) Foreign Application Priority Data
Aug. 14, 2008 (JP) .............. PA 2008-208961

(51) Int. Cl.
*B05D 5/12* (2006.01)

(52) U.S. Cl. .............. 427/127; 427/130; 428/833.6

(58) Field of Classification Search ............. 29/898.1; 427/127, 129; 428/833.6, 833.4, 833.3, 833.7
See application file for complete search history.

(56) References Cited

U.S. PATENT DOCUMENTS

| | | | |
|---|---|---|---|
| 5,256,511 A * | 10/1993 | Matsumura et al. | 430/111.1 |
| 6,355,300 B1 * | 3/2002 | Stirniman et al. | 427/127 |
| 2006/0148671 A1 * | 7/2006 | Dams et al. | 510/494 |
| 2009/0023017 A1 * | 1/2009 | Tomiyasu et al. | 428/833.3 |
| 2010/0006595 A1 * | 1/2010 | Ma et al. | 222/3 |

FOREIGN PATENT DOCUMENTS

| | | | |
|---|---|---|---|
| JP | 05-189761 | * | 7/1993 |
| JP | 05-189761 A | | 7/1993 |
| JP | 08-161739 A | | 6/1996 |
| JP | 2002-157732 A | | 5/2002 |
| JP | 2004-199723 A | | 7/2004 |
| JP | 2004-246985 A | | 9/2004 |
| JP | 2005-088485 A | | 4/2005 |

* cited by examiner

*Primary Examiner* — Michael Cleveland
*Assistant Examiner* — Tabassom Tadayyon Eslami
(74) *Attorney, Agent, or Firm* — Rabin & Berdo, P.C.

(57) ABSTRACT

A method of manufacturing a magnetic recording medium that includes a nonmagnetic underlayer, a magnetic layer, a protective layer, and a lubricant layer sequentially laminated on a nonmagnetic substrate. The method includes applying a lubricant onto the protective layer to form the lubricant layer, which includes ejecting shots of a heated lubricant liquid onto the protective layer from a nozzle. The heated lubricant liquid contains a perfluoropolyether lubricant, and each shot is of a quantity in a range of 0.1 to 10 pico liters.

6 Claims, 3 Drawing Sheets

METHOD OF MANUFACTURING A MAGNETIC RECORDING MEDIUM

CROSS-REFERENCE TO RELATED APPLICATION

This application is based on, and claims priority to, Japanese Patent Application No. 2008-208961, filed on Aug. 14, 2008, the content of which are incorporated herein by reference.

BACKGROUND OF THE INVENTION

1. Field of the Invention

The present invention relates to a method of manufacturing a magnetic recording medium, which includes, in particular, a featured step of forming a lubricant layer.

2. Description of the Related Art

Fixed magnetic recording media are used for data recording in computers. A fixed magnetic recording medium apparatus has a mechanism for driving a magnetic recording medium, a mechanism for driving a magnetic head, a mechanism for stopping the magnetic head, and a mechanism for controlling data transmission. The fixed magnetic recording medium apparatus also has one or more magnetic recording media installed in the apparatus. Fixed magnetic recording medium apparatuses in recent years have progressed remarkably towards higher recording density, larger capacity, and faster data transmission rate.

In a conventional fixed magnetic recording medium apparatus, a CSS system (contact start and stop system) is employed, in which the magnetic head flies when the magnetic recording medium rotates, and comes in contact with the surface of the magnetic recording medium when the rotation driving motor for rotating the magnetic recording medium stops. In this system, the magnetic head slides on the surface of the magnetic recording medium in the processes of starting and stopping the rotation of the magnetic recording medium, and generates friction between the head and the medium, thereby causing damage in the magnetic layer of the magnetic recording medium. In order to protect the magnetic layer against the damage due to friction, a protective layer is formed on the surface of the magnetic layer, and further, a lubricant layer is formed on the protective layer for improving surface lubricating performance.

The lubricant layer for improving surface lubricating performance of a magnetic recording medium must be formed stably on the surface of the protective layer with a uniform thickness. In addition, it is important that the lubricant layer adheres firmly and bonds strongly to the protective layer. A type of lubricant used for obtaining the firm adhesiveness is a perfluoropolyether lubricant having an end group or groups of a hydroxyl group or a piperonyl group. Specific examples of the perfluoropolyether lubricant include "Fomblin Z DOL" and "AM2001", both being products of Solvey Solexis Company. For many of the perfluoropolyether lubricants used for conventional magnetic recording media, the lubricating performance and heat-resisting property deteriorate if the molecular weight of the perfluoropolyether lubricant is too small, or, if the molecular weight is too large, the magnetic recording media are liable to adsorb. Accordingly, a number-averaged molecular weight Mn in the range of 1,000 to 10,000 preferably is used. It is yet possible to reduce ill effects of adsorption and poor heat resistance by narrowing the molecular weight distribution range.

The dip-coating method, which is one of the known methods for forming a lubricant layer, is widely used. In the process of coating with a perfluoropolyether lubricant, a lubricant solution is generally used with a fluorine-containing solvent. The selection of the solvent is a crucial issue in this process, in view of the effects of the solvent on the environment and the cost. The boiling point of the solvent is one of the restricting conditions in the selection of the solvent. A solvent having a boiling point of about 60° C. is generally used, and a lubricant concentration is several hundred ppm in weight in most cases.

In a magnetic recording medium after applying the perfluoropolyether lubricant, a thick area (of lubricant accumulation) may be formed at a spot of contact with the hanger for supporting the magnetic recording medium in the application process. The thick area degrades the uniformity of the thickness of the medium.

The spin-coating method, another known technique uncommon today, can also be used for coating a magnetic recording medium with the lubricant. The technique uses a solvent with a high boiling point (over 80° C.) and forms a lubricant layer by making droplets of coating liquid falling through a nozzle onto the rotating magnetic recording medium.

Spraying is also known as a coating technique in other technical fields. Japanese Unexamined Patent Application Publication No. H05-189761 discloses a method of spraying a mist of lubricant without using a fluorine-containing gas. Japanese Unexamined Patent Application Publication No. H08-161739 discloses an apparatus for forming a lubricant layer by spraying droplets of lubricant of a uniform size using ultrasonic vibration.

Japanese Unexamined Patent Application Publication No. 2004-246985 discloses an ink jet method for coating with lubricant. This method uses a low viscosity lubricant, and a lubricant layer is formed by self leveling at an ambient temperature.

The technique for forming a lubricant layer by means of a dip-coating method uses a solvent with a low boiling point of about 60° C. for preparing the lubricant solution. As a result, there is a risk of large load on the environment caused by the evaporation of the solvent during the storage and application process of the lubricant solution.

Moreover, it is also feared, as described earlier, that accumulation of lubricant in the coating process hinders the effort of reducing the flying height of the magnetic head.

Since the technique for forming a lubricant layer by means of a spin coating method utilizes diffusion of the solution by a centrifugal force, it is difficult to control the process conditions to accomplish a uniform film thickness, with a difference of several Angstroms between the inner and outer circumferences. Further, since the selection of the solvent is very limited, it is difficult to apply a lubricant having a low solubility like "Fomblin Z Tetraol" (a product of Solvey Solexis Company). There is an additional problem that the heat of vaporization is necessary for vaporizing the solvent, which cools the coated magnetic recording medium, causing condensation of moisture in the air.

In the technique for forming a lubricant layer by means of the spray method as disclosed in Japanese Unexamined Patent Application Publications No. H05-189761 and No. H08-161739, the concentration of the lubricant solution is about 0.05 wt %, which is almost the same value as the one in the dip-coating method employed in magnetic recording media. Consequently, it is hard to reduce the amount of solvent consumption. It is yet difficult in these spray methods, in which the solution is once transformed into mist, to form a lubricant layer having a desired thickness in a desired narrow region, or to form a lubricant layer having a selected region composed of a different type of lubricant agent from the lubricant in the other regions.

Japanese Unexamined Patent Application Publication No. 2004-246985 presumes the use of low viscosity lubricant, it is thus impossible to use a lubricant with a high viscosity (higher than 1,000 mPa-s at 20° C.) like "Fomblin Z Tetraol" (a product of Solvey Solexis Company). This method forms a lubricant layer with self-leveling at an ambient temperature, and there is no means for improving adhesiveness of the lubricant layer.

In a conventional process of forming a lubricant layer, a magnetic recording medium coated with a lubricant layer is then subjected to a step of heating or UV irradiation in order to improve the adhesiveness between the lubricant layer and the surface of the magnetic recording medium. A heating step in particular, needs to be carried out at a temperature in a range of 70° C. to 150° C. for a time duration of from 15 minutes to 2 hours. Thus, a conventional process of forming a lubricant layer is a time-consuming step in the process of manufacturing a magnetic recording medium.

SUMMARY OF THE INVENTION

An object of the present invention is therefore to provide a method of manufacturing a magnetic recording medium with a high recording density at a low cost, with little environmental load, and in a short time.

A method of manufacturing a magnetic recording medium of the invention manufactures a magnetic recording medium including at least a nonmagnetic underlayer, a magnetic layer, a protective layer, and a lubricant layer sequentially laminated on a nonmagnetic substrate. The method includes a step of forming a lubricant layer in which a lubricant liquid containing at least the perfluoropolyether lubricant is injected in a heated condition in a quantity of from 0.1 to 10 pico liters in one shot through a nozzle.

The method of the invention remarkably reduces the consumption of the fluorine-containing solvent. The method provides a smooth lubricant layer without a spot of lubricant accumulation that may touch with the magnetic head. Consequently, a magnetic head with a low flying height can be utilized, reducing the space between the magnetic head and a magnetic recording layer. Therefore, a magnetic recording medium with a high recording density can be provided. Moreover, since the lubricant is applied in a heated condition, a lubricant with relatively high viscosity can be utilized. Therefore, a lubricant layer exhibiting high adhesiveness to the magnetic recording medium is formed in a short time.

DETAILED DESCRIPTION OF THE INVENTION

Figure 1:
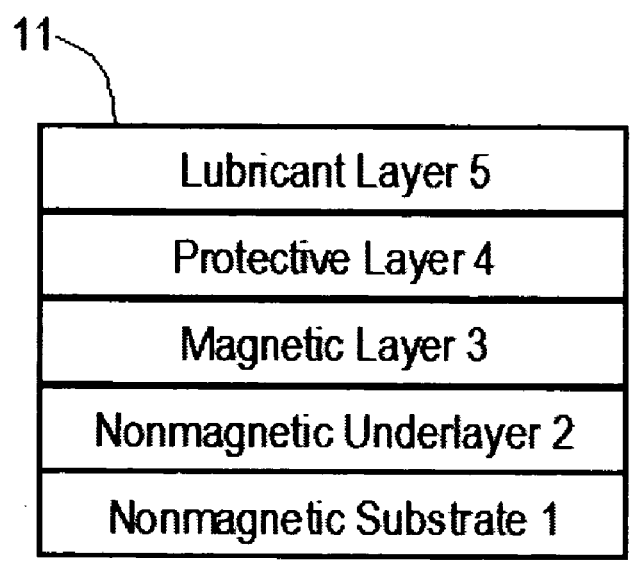
FIG. 1 is a diagram of a magnetic recording medium manufactured by the invention.

A magnetic recording medium 11 manufactured by a manufacturing method of the invention includes a nonmagnetic underlayer 2, a magnetic layer 3, a protective layer 4, and a lubricant layer 5 sequentially laminated on a nonmagnetic substrate 1, as illustrated in FIG. 1. The nonmagnetic underlayer 2 can be composed of a nonmagnetic metal, for example, chromium. Magnetic material composing the magnetic layer 3 can be a cobalt alloy, for example. The protective layer 4 can be a layer of carbon, for example.

The nonmagnetic underlayer 2, the magnetic layer 3 and the protective layer 4 can be formed on the substrate 1, after introducing the substrate 1 into a vacuum chamber, by depositing a chromium underlayer and a cobalt alloy magnetic layer in this order using a sputtering method, and depositing a carbon protective layer thereon using a sputtering method or a CVD (chemical vapor deposition) method.

The lubricant layer 5 is formed on the protective layer 4 by injecting a lubricant liquid containing at least the perfluoropolyether lubricant in a heated condition through a nozzle 12 (FIG. 2) in a quantity of 0.1 to 10 pico liters ($10^{-7}$ to $10^{-5}$ mm$^3$) per shot.

The lubricant used in the invention is composed of perfluoropolyether. The lubricant liquid injected through the nozzle can be composed solely of the perfluoropolyether lubricant or can be a solution of the perfluoropolyether lubricant dissolved in a fluorine-containing solvent. In the latter case, concentration of the lubricant is preferably at least 0.1 wt %.

For forming a lubricant layer of Z-Tetraol with a thickness of 1.0 nm, a lubricant in a quantity of about $6 \times 10^{-3}$ mm$^3$ is required for one surface of a magnetic recording medium with an inner diameter of 20 mm and an outer diameter of 65 mm. Current technologies in ink-jet printers allow the liquid injection of several pico liters (1 pL=$10^{-6}$ mm$^3$). A film of about 1 nm thick can be formed in an area of 0.1 mm$^2$ with one pL of coating liquid of Z Tetraol dissolved in a florin-containing solvent "Vertrel XF" (a product of DuPont-Mitsui Fluorochemicals Co., Ltd.) in a concentration of 1 wt %. Consumption of the solvent in this case is about 12 mL for both surfaces of 10,000 sheets of magnetic recording media. This is a remarkably reduced quantity as compared with the common solvent consumption in a dip-coating method (3,000 mL for 10,000 sheets). Even if the liquid concentration is 0.1 wt %, the consumption is thus 120 mL, it is still effective for the reduction of consumption of the solvent. Thus, a preferred concentration is between 100 wt % and 0.1 wt %.

The quantity of the lubricant liquid injected in one shot through the nozzle is 0.1 pL to 10 pL in the invention. A quantity of more than 10 pL makes a droplet too large to form a thin film of a desirable thickness, requiring the dilution of the lubricant with a large amount of solvent. Thus, the objective of reducing solvent consumption cannot be attained. A quantity of less than 0.1 pL needs multiple shots of injections of the lubricant liquid through the nozzle, therefore elongating the processing time for each sheet.

In conventional dip-coating methods, the lubricant concentration varies due to the evaporation of solvent and the decrease in solute of lubricant after a long-term use. Accordingly, frequent checks must be conducted on the thickness of the lubricant layer by sampling, which is not the case in the method of the invention.

In the present invention, a lubricant liquid injected through the nozzle is necessarily in a heated condition.

The temperature of the lubricant liquid is controlled to be in a predetermined range, so as to adjust the viscosity of the lubricant liquid. A lubricant with a high viscosity at the room temperature in particular, needs to be heated to reduce the viscosity. A specific example of "Fomblin Z Tetraol" is preferably heated to at least 60° C. to reduce the viscosity to about 100 mPa-s.

A heated lubricant improves the adhesiveness between the lubricant layer and the surface of the magnetic recording medium. The temperature of the heated lubricant is preferably in the range of 60° C. to 200° C. A temperature over 200° C. involves a risk of the degeneration of the lubricant itself. A temperature below 60° C. results in insufficient effects in the adhesiveness improvement and viscosity reduction. Feasibility of the direct application of a heated lubricant is one of the merits of the ink-jet method. In contrast, the dip-coating method and the spin-coating method cannot implement such a process, because they need to use a solution diluted with a sufficient amount of solvent.

Figure 2:
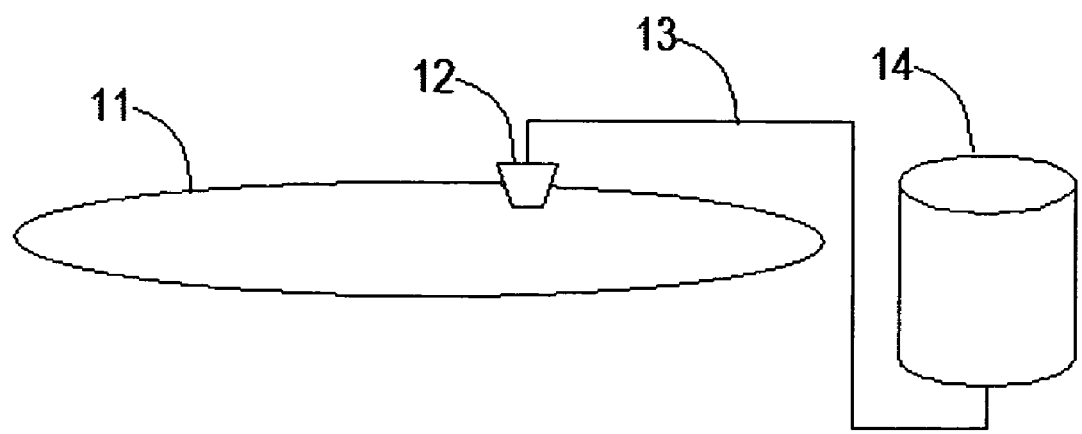
FIG. 2 is a diagram illustrating a process of forming a lubricant layer by injecting a lubricant liquid.

As illustrated in FIG. 2, the lubricant liquid injected through the nozzle 12 is supplied in a heated condition from a lubricant tank 14 through a piping 13. Heating of the lubricant liquid is desired to be controlled so that the temperature of one or more parts among the nozzle 12, the piping 13, the lubricant tank 14, and the magnetic recording medium 11 is within a predetermined range. The temperature of the lubricant liquid to be injected from the nozzle 12 may be controlled within the temperature range mentioned above by heating the nozzle 12, by heating the piping 13, by heating the lubricant liquid in the lubricant tank 14, or by combining two or more of the above heating processes. In addition, heating of the magnetic recording medium 11 can be combined with the above-mentioned controlling methods.

Figure 3A:
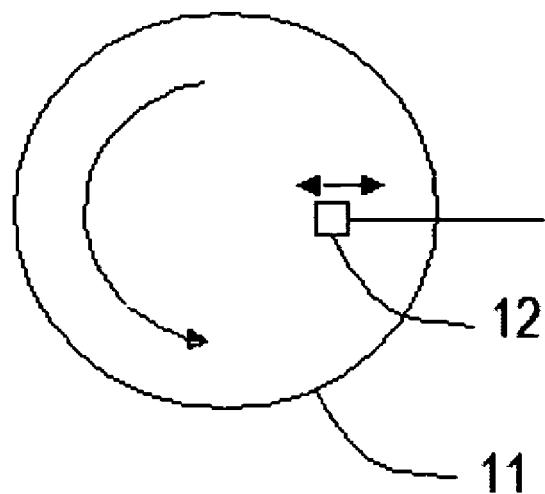
FIG. 3A is a diagram showing forming a lubricant layer by rotating the magnetic recording medium and moving the nozzle in a radial direction.
Figure 3B:
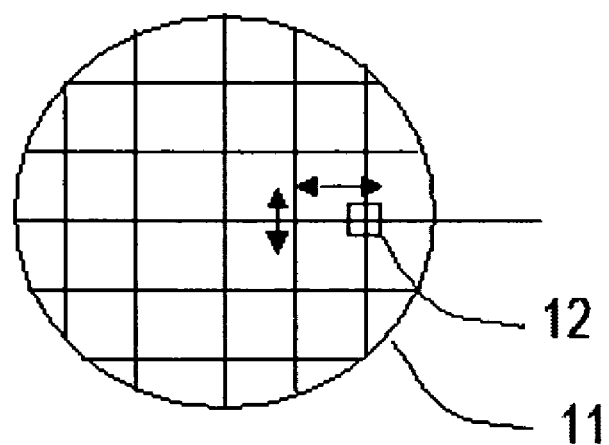
FIG. 3B is a diagram showing forming a lubricant layer by shifting the nozzle in a raster pattern.

A lubricant layer can be formed employing the way in which the magnetic recording medium is rotated and the nozzle is moved in the radial direction, as illustrated in FIG. 3A. In another feasible way of forming a lubricant layer, the relative position of the magnetic recording medium and the nozzle is shifted in a raster pattern to form a lubricant film of a desired type of lubricant with a desired thickness at a desired place, as illustrated in FIG. 3B. The former way is suited for forming a homogeneous lubricant layer having a uniform thickness over the whole surface of the magnetic recording medium. The latter way is suited for forming a lubricant layer having different thicknesses, or formed of different types of lubricant in different places.

In the method of shifting the nozzle in radial direction while rotating the magnetic recording medium, any desired thickness of a lubricant layer can be set at any desired place by setting the speed of the relative position variation (or the scanning speed) between the nozzle and the magnetic recording medium at a desired relative position, or by setting the injection rate of the lubricant liquid through the nozzle at a desired value.

Figure 4:
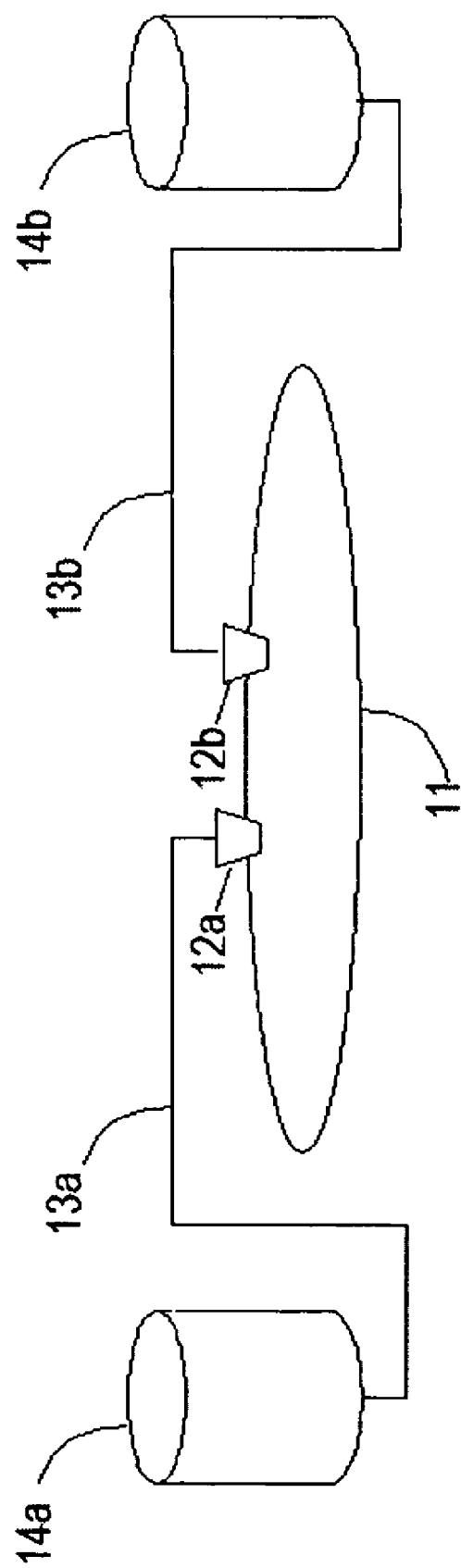
FIG. 4 is a diagram illustrating a process of forming a lubricant layer using two nozzles.

Further, a lubricant layer can be formed on the surface of the magnetic recording medium using two or more different types of lubricant liquid from a plurality of nozzles, as illustrated in FIG. 4 showing two nozzles 12a and 12b, piping 13a and 13b, and two lubricant tanks 14a and 14b.

By using different types of lubricants or by varying the thickness of the lubricant layer, it is feasible to form a lubricant layer including a region with a high fluidity selectively on the CSS region, on which the magnetic head stops, or on the load-unload region, on which the magnetic head makes a landing or takes off.

Moreover, by injecting two types of lubricants on the same surface in quantities independent with each other, a lubricant layer can be formed with a precisely controlled ratio of the two types of lubricant.

Thus, lubricant layer designs that have never existed are feasible by using a lubricant on the CSS region and the load-unload region that is different from the lubricant on the data region, or by setting a thickness for the CSS region and the load-unload region that is different from the thickness for the data region. Both the lubricant type change and the thickness variation can also be employed simultaneously. Thus, magnetic recording media exhibiting long-term reliability are provided.

After forming the lubricant layer, steps of tape-wiping and ultraviolet light irradiation may be additionally conducted in order to well fit the lubricant layer with the medium surface. If necessary, a further heating step may be added. Despite the additional heating step, the total heating time is shorter than that in the process employing the coating step of an ordinary dip-coating method.

<Reduction in Consumption of Fluorine-Containing Solvent>

Fluorine-containing solvent used at present for cleaning magnetic recording media and for coating with lubricant is costly and create a great environmental load. So, its reduction is demanded. The present invention remarkably reduces the consumption of the fluorine-containing solvent.

<Manufacture of a Medium in a Short Time>

Application of the heated lubricant enhances the adhesiveness between the lubricant and the medium surface as compared with applications at room temperature. As a result, a following heating step can be eliminated or carried out in a short time.

<A Magnetic Recording Medium with High Recording Density>

Because any spot of lubricant accumulation, which may come into contact with the magnetic head, is eliminated in principle, a magnetic head with low flying height can be used, and the space between the magnetic head and the magnetic recording layer is reduced. Therefore, a magnetic recording medium with a high recording density is provided.

As described thus far, the invention provides a method of manufacturing a magnetic recording medium, the method being less costly, creating a smaller environmental load, and consuming shorter processing time. The invention provides a magnetic recording medium with a high recording density.

What is claimed is:

1. A method of manufacturing a magnetic recording medium, the magnetic recording medium including a nonmagnetic underlayer, a magnetic layer, a protective layer, and a lubricant layer sequentially laminated on a nonmagnetic substrate, the method comprising:

applying a lubricant onto the protective layer to form the lubricant layer, including ejecting shots of a heated lubricant liquid onto the protective layer from a nozzle, and moving the nozzle in a radial direction of the magnetic recording medium while rotating the magnetic recording medium during the ejecting, wherein the heated lubricant liquid contains a perfluoropolyether lubricant, and each shot is of a quantity in a range of 0.1 to 10 pico liters.

2. The method of claim 1, wherein the heated lubricant liquid consists solely of the perfluoropolyether lubricant.

3. The method of claim 1, wherein the heated lubricant liquid is a solution of the perfluoropolyether lubricant dissolved in a fluorine-containing solvent with a concentration of at least 0.1 wt %.

4. A method of manufacturing a magnetic recording medium, the magnetic recording medium including a nonmagnetic underlayer, a magnetic layer, a protective layer, and a lubricant layer sequentially laminated on a nonmagnetic substrate, the method comprising:

applying a lubricant onto the protective layer to form the lubricant layer, including ejecting shots of a heated lubricant liquid onto the protective layer from a nozzle, and shifting a relative position between the magnetic recording medium and the nozzle in a raster pattern during the ejecting, wherein the heated lubricant liquid contains a perfluoropolyether lubricant, and each shot is of a quantity in a range of 0.1 to 10 pico liters.

5. The method of claim 4, wherein the heated lubricant liquid consists solely of the perfluoropolyether lubricant.

6. The method of claim 4, wherein the heated lubricant liquid is a solution of the perfluoropolyether lubricant dissolved in a fluorine-containing solvent with a concentration of at least 0.1 wt %.

* * * * *